United States Patent [19]

Lemmey

[11] Patent Number: 4,575,236
[45] Date of Patent: Mar. 11, 1986

[54] DENTAL X-RAY DUPLICATOR

[76] Inventor: Edgar S. Lemmey, 108 Aspen Dr., Woodbury, N.Y. 11797

[21] Appl. No.: 642,753

[22] Filed: Aug. 21, 1984

[51] Int. Cl.$^4$ .................... G03B 27/72; G03B 27/04
[52] U.S. Cl. .................................. 355/115; 355/120
[58] Field of Search ................... 355/113, 115, 120

[56] References Cited

U.S. PATENT DOCUMENTS

| 1,824,622 | 9/1931 | Reedy | 355/120 |
| 4,502,781 | 3/1985 | Nguyen | 355/115 |

FOREIGN PATENT DOCUMENTS 50111 10/1911 Fed. Rep. of Germany ...... 355/120

Primary Examiner—Richard A. Wintercorn
Attorney, Agent, or Firm—Darby & Darby

[57] ABSTRACT

A latent contact photographic copy of an original image is formed by apparatus comprising a translucent platen for supporting on one side thereof an assembly including an original image to be copied and an unexposed photographic film overlying the original image. Parallel connected lamps mounted on the opposite side of the platen are provided for irradiating the photographic film through the platen and original image. A cover is movable between an open position in which it uncovers the platen for receiving the assembly and a closed position in which it covers the platen and assembly. A circuit connected to the lamps includes a switch for selectively enabling the circuit to activate the lamps. The switch is mounted for contact with the cover when the cover is in the closed position. The switch is thus closed to effect exposure of the photographic film in response to pressure exerted on the cover when the cover is in the closed position. An LED flashes once per second during the exposure to facilitate timing the exposure.

11 Claims, 5 Drawing Figures

DENTAL X-RAY DUPLICATOR

BACKGROUND OF THE INVENTION

This invention relates to the copying of images and, more particularly, to novel and highly-effective apparatus for forming a latent contact photographic copy of an original image.

It is necessary in many circumstances and for many reasons to make multiple copies of original images that have been made by X-ray machines, cameras, etc.

In the field of dentistry, for example, X-ray images are among the most important diagnostic aids available, and these images must be reproduced for professional, insurance and record-keeping purposes, among others. In conventional practice, the dentist or his assistant must send X-ray images out to an independent copying service or must procure such conventional equipment as may be available for in-house use.

Both of these alternatives are unsatisfactory. The first deprives the dentist of access to the original image during the period when it is being copied and risks loss of or damage to the original. The second is expensive and inconvenient because of the deficiencies of the best copying machines heretofore available for in-house use. These deficiencies include awkward arrangements for initiating film exposure and unsatisfactory means for timing the exposure.

SUMMARY OF THE INVENTION

An object of the invention is to remedy the problems outlined above. More particularly, an object of the invention is to provide inexpensive apparatus that can be used conveniently in-house by a dentist or his assistant to copy dental X-rays.

The foregoing and other objects of the invention are attained in apparatus for forming a latent contact photographic copy of an original image, the apparatus comprising a translucent platen for supporting on one side thereof an assembly including an original image to be copied and an unexposed photographic film overlying the original image. Irradiating means is mounted on the opposite side of the platen for irradiating the photographic film through the platen and original image. A cover is movable between an open position in which it uncovers the platen for receiving the assembly and a closed position in which it covers the platen and assembly.

A circuit connected to the irradiating means includes a switch for selectively enabling the circuit to energize the irradiating means. The switch is mounted for contact with the cover when the cover is in the closed position.

The switch is thus closed to effect exposure of the photographic film in response to pressure exerted on the cover when the cover is in the closed position.

A timer of special construction is preferably provided for timing the exposure, and an indicator responsive to the timer enables the operator to keep track of the exposure time.

BRIEF DESCRIPTION OF THE DRAWING

A better understanding of the invention can be gained from the following detailed description of the preferred embodiment thereof, in conjunction with the appended figures of the drawing, wherein.

DESCRIPTION OF THE PREFERRED EMBODIMENT

Figure 1:
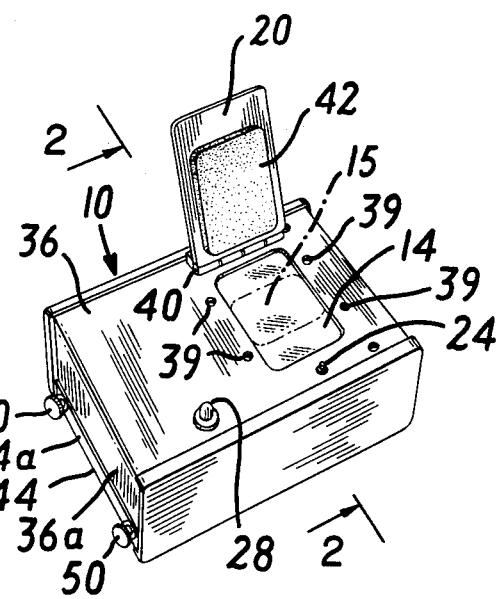
FIG. 1 is a perspective view of a preferred embodiment of apparatus constructed in accordance with the invention.
Figure 2:
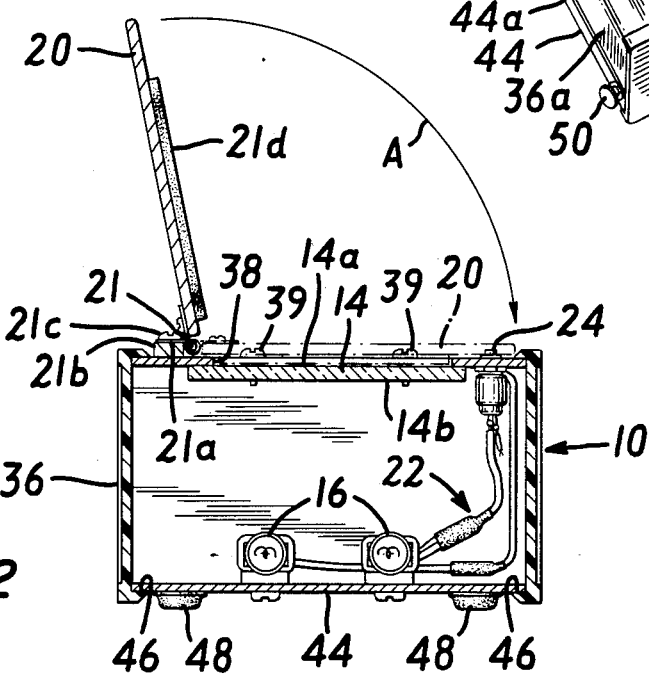
FIG. 2 is a sectional view taken along the line 2—2 of FIG. 1 and looking in the direction of the arrows.
Figure 5:
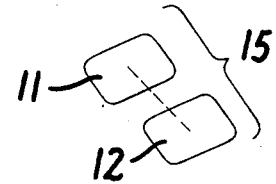
FIG. 5 is an exploded view of an assembly of an original image and a film on which the image is copied by the apparatus of the invention.
Figure 3:
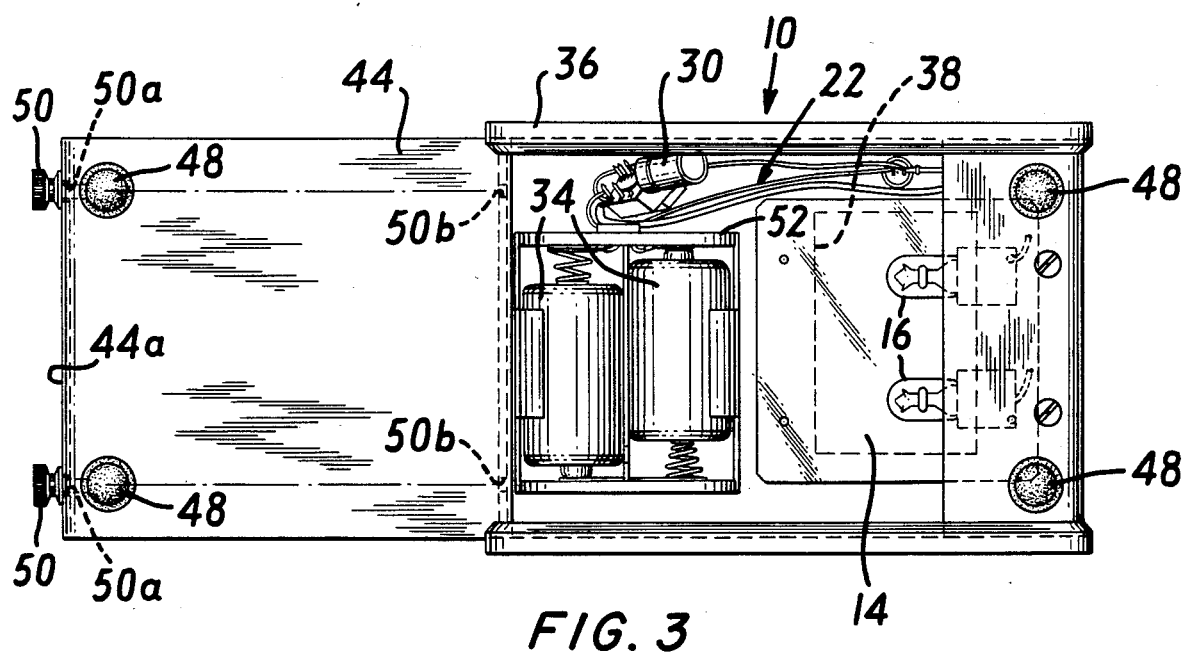
FIG. 3 is a bottom plan view of the apparatus with a back access cover open.

FIGS. 1–3 show apparatus 10 constructed in accordance with the invention for forming on a photographic film 11 (FIG. 5) a latent contact photographic copy or duplicate of an original image on a transparency 12. The apparatus 10 comprises a translucent rectangular platen 14 for supporting on one side 14a thereof an assembly 15 (FIGS. 1 and 5) including the original image 12 to be copied and the unexposed photographic film 11 overlying the original image 12. The platen 14 diffuses any light passing therethrough to distribute light substantially uniformly over the area of the transparency 12.

Irradiating means such as a pair of parallel-connected lamps 16 (FIGS. 2-4) is placed on the opposite side 14b of the platen 14 for irradiating the photographic film 11 through the platen 14 and original image 12.

A cover 20 is movable as indicated by an arrow A between an open position shown in solid outline in FIGS. 1 and 2, in which it uncovers the platen 14 for receiving the assembly 15, and a closed position shown in broken outline in FIG. 2, in which it covers the platen 14 and assembly 15. The movement is pivotal and is facilitated by a pivot 21 (FIG. 2) which connects the cover 20 to a housing 36 (described in more detail below) via a hinge 21a, hinge plate 21b and screws 21c. A pressure pad 21d is mounted on the side of the cover 20 which faces the platen 14 in the closed position.

Figure 4:
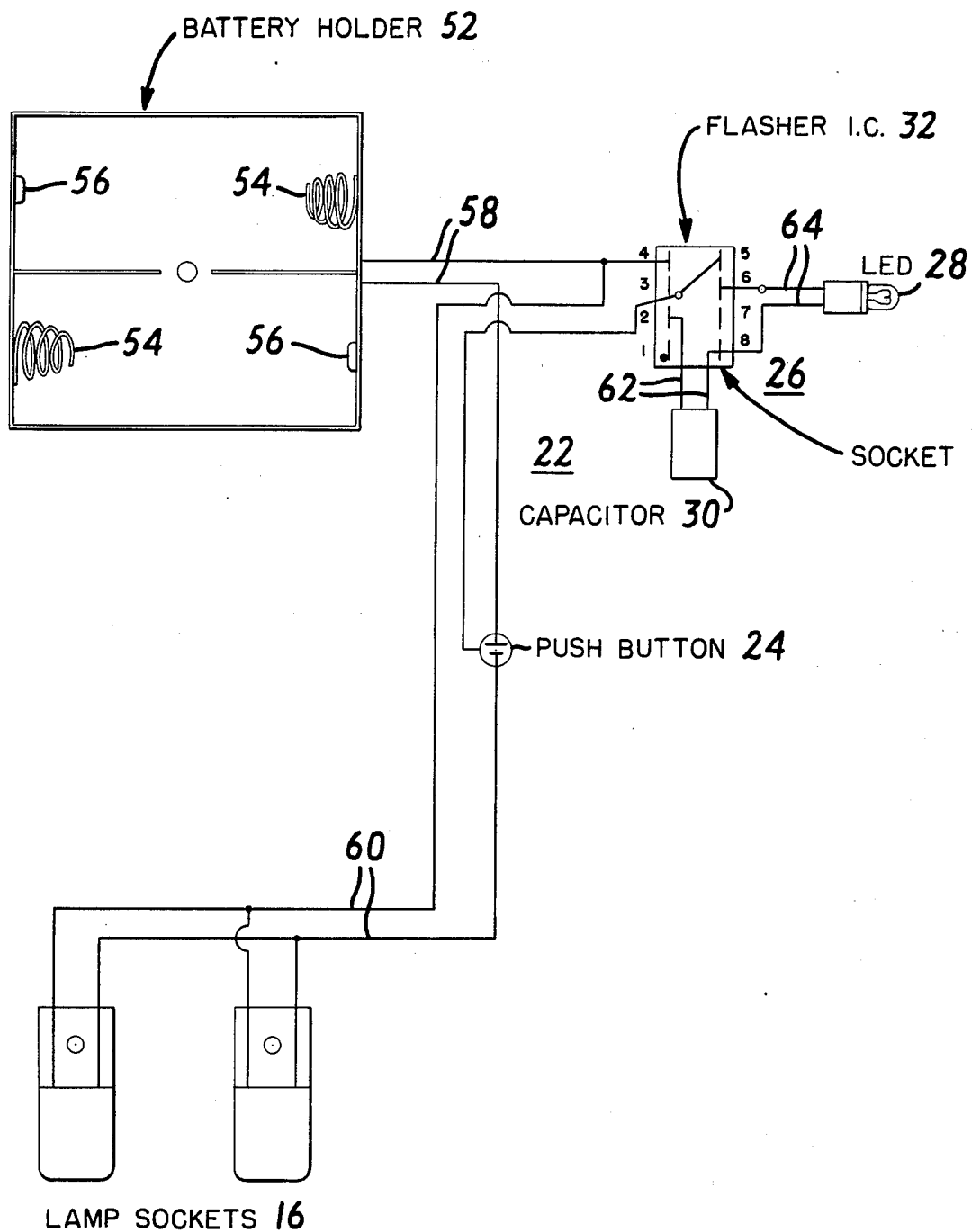
FIG. 4 is a schematic view of a circuit employed in the apparatus.

A circuit 22 partially shown in FIGS. 2 and 3 and best shown in FIG. 4 is connected to the lamps 16 and includes a push-button switch 24 shown in FIGS. 1, 2 and 4 for selectively enabling the circuit 22 to energize the lamps 16. The push-button switch 24 is mounted for contact with the cover 20, as explained in greater detail below, when the cover 20 is in the closed position. The switch 24 is thus closed to effect exposure of the photographic film 11 in response to pressure exerted on the cover 20 when the cover 20 is in the closed position.

Exposure of the film 11 must of course be made in a darkroom equipped with a suitable safelight or in a conventional daylight loader (not shown). In order to initiate the exposure, after the assembly 15 has been placed on the platen 14 and the cover 20 has been closed, it is only necessary for the operator to place a finger on the cover 20 and press in order to close the switch 24 and begin the exposure of the film 11.

The circuit 22 also includes a timer circuit 26 (FIG. 4) for timing the exposure and an indicator 28 (FIGS. 1 and 4) responsive to the timer circuit 26.

The timer circuit 26 comprises a capacitor 30 in a flasher circuit 32 having a selected time constant. The timer circuit 26 effects alternate charging and discharging of the capacitor 30 at a rate dependent on the time constant of the circuit 32, and the indicator 28 produces an indication dependent on the alternate charging and discharging of the capacitor 30.

The indicator 28 is preferably a red light-emitting diode (LED) which flashes once per cycle of charging and discharging of the capacitor 30. The time constant is preferably selected to cause the flashes to have a repetition rate of substantially one per second. Accordingly, to time a seven-second exposure, for example, the operator simply counts seven flashes of the LED 28. To darken or lighten the copies, the exposure time is reduced or increased, as those skilled in the art will understand.

The latent image thus formed on film 11 is thereafter processed or developed in a conventional manner. Even if the film 11 is sent away for such processing, however, the original image 12 remains safely in the custody of the dentist or other operator of the apparatus 10 and is not at risk of being lost or damaged by an outside agency.

The circuit 22 is preferably powered by batteries 34 (FIG. 3) and includes the flasher circuit 32 (FIG. 4) for control of the lamps 16, having the timing circuit capacitor 30 and indicator diode 28. The flasher circuit 32 can be an Archer P.N. 276-1705 LED flasher IC-3909 and can be mounted in an Archer P.N. 276-198 eight-pin wire wrapping socket. The LED indicator 28 can be a Leecraft P.N. 71381 L590-R2-W. Of course, other standard components can be substituted, as those skilled in the art will appreciate.

A hollow housing 36 (FIG. 3) is formed with a rectangular aperture 38 accommodating the platen 14. The platen 14 may have dimensions somewhat exceeding the corresponding dimensions of the aperture 38 and may be secured to the inside of the housing 36 peripherally of the aperture 38 by screws 39 (FIGS. 1 and 2). The side 14a of the platen 14 on which the film and transparency assembly 15 is placed faces the outside of the housing 36, and the opposite side 14b of the platen 14 faces the inside of the housing 36.

The lamps 16 and circuit 22 (excluding the switch 24) are mounted inside the housing 36, and the switch 24 comprises an actuator portion protruding through the housing 36, as shown in FIGS. 1 and 2, to the outside thereof for contact with the cover 20. The LED 28 is mounted on the housing 36 so that it is visible from the outside thereof.

The area of the platen 14 which is visible through the aperture 38 from a position outside the housing 36 may be substantially equal to the area of two standard dental X-ray negatives, so that copies of one or two original images can be made simultaneously.

The housing 36 includes a back access cover 44 permitting access to the interior of the housing 36. The access cover 44 can slide in tracks 46 between a closed position indicated in FIGS. 1 and 2 and an open position indicated in FIG. 3. Padded feet 48 provided on the access cover 46 and bottom of the housing 36 enable the apparatus 10 to be supported on a surface without scratching either the apparatus 10 or the supporting surface. The access cover 44 has a flange 44a at one end thereof which extends in a direction parallel to the side 36a of the housing 36. Thumb screws 50 pass through apertures 50a and 50b formed in the flange 44a and side 36a, respectively, and secure the access cover 44 in the closed position.

A battery holder 52 shown in FIGS. 3 and 4 holds the batteries 34. The battery holder 52 is provided with springs 54 which serve as negative contacts and also has positive contacts 56. The flasher circuit is connected to the batteries 34 by leads 58, to the lamps 16 by leads 60, to the capacitor 30 by leads 62, and to the LED 28 by leads 64.

Thus there is provided in accordance with the invention novel and highly-effective apparatus for forming a latent contact photographic copy of an original image.

The present invention thus provides a simple, inexpensive, small and portable arrangement for duplicating X-ray or similar images, as by contact printing. It is easy to use, even by unskilled or untrained persons, merely by placing the assembly of transparency (or negative) and film on the platen while in a light-suppressing environment, closing and holding down the cover, and counting the flashes of the indicator for the appropriate time. The invention utilizes a minimum of widely available and inexpensive parts to produce a simply manufacturable product. The simplicity of design and standardized parts lead to a high degree of reliability.

Many modifications of the preferred embodiment of the invention disclosed above will readily occur to those skilled in the art upon considering this disclosure. For example, the number and type of lamps 16 and batteries 34, the size of the aperture 38 and platen 14, and the flash repetition rate of the LED 28 may be varied, as those skilled in the art will readily understand. Accordingly, the invention is to be construed as including all apparatus which is within the scope of the appended claims.

What is claimed is:

1. Apparatus for forming a latent contact photographic copy of an original image, said apparatus comprising
    translucent platen means for supporting on one side thereof an assembly including an original image to be copied and an unexposed photographic film overlying said original image,
    irradiating means mounting on the opposite side of said platen means for irradiating said photographic film through said platen means and original image,
    cover means movable between an open position in which it uncovers said platen means for receiving said assembly and a closed position in which it covers said platen means and assembly, and
    circuit means connected to said irradiating means,
    said circuit means including switch means for selectively enabling said circuit means to energize said irradiating means, and
    said switch means being mounted for contact with said cover means when said cover means is in said closed position,
    whereby said switch means is closed to effect exposure of said photographic film in response to pressure exerted on said cover means when said cover means is in said closed position,
    said circuit means comprising timing means for timing said exposure and indicator means responsive to said timing means, and
    said timing means comprising a time constant circuit including a capacitor and having a selected time constant, said timing means effects alternate charging and discharging of said capacitor at a rate dependent on said time constant, and said indicator means produces an indication dependent on said alternate charging and discharging.

2. Apparatus according to claim 1 wherein said indicator means is a light-emitting diode which flashes once per cycle of said charging and discharging.

3. Apparatus according to claim 2 wherein said flashes have a repetition rate of substantially one per second.

4. Apparatus according to claim 2 wherein said circuit means comprises an integrated circuit connected to said indicator means, capacitor and diode for facilitating control thereof.

5. Apparatus according to claim 1 wherein said circuit means comprises battery means for supplying power thereto.

6. Apparatus according to claim 1 further comprising hollow housing means formed with an aperture accommodating said platen means, said one side and opposite side of said platen means respectively facing the outside and inside of said housing means.

7. Apparatus according to claim 6 wherein said cover means is pivotally connected to said housing means and moves pivotally between said open and closed positions.

8. Apparatus according to claim 7 wherein said cover means comprises a pressure pad on the side thereof which faces said platen means in said closed position.

9. Apparatus according to claim 6 wherein said irradiating means and said circuit means excluding said switch means are mounted inside said housing means and said switch means comprises a portion protruding through said housing means to the outside thereof for contact with said cover means.

10. Apparatus according to claim 6 wherein said indicator means is mounted on said housing means and visible from the outside thereof.

11. Apparatus according to claim 1 wherein said platen means has an area substantially equal to the area of two standard dental X-ray negatives.

* * * * *